M. BECK.
CUSHION TIRE AND METHOD OF MAKING THE SAME.
APPLICATION FILED MAR. 9, 1918.
1,270,591. Patented June 25, 1918.
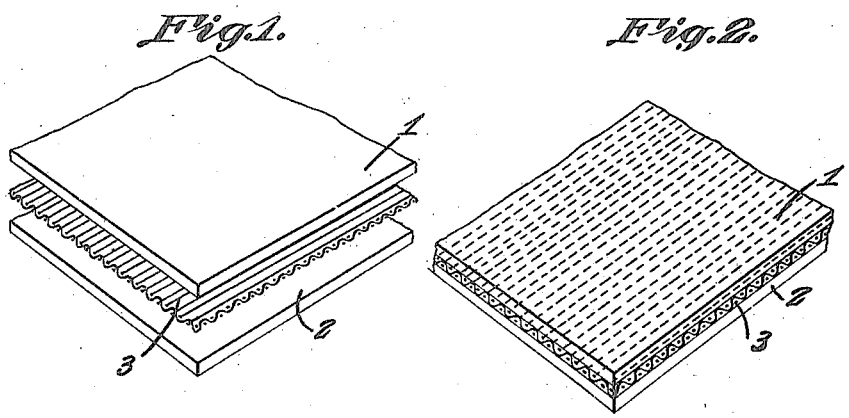
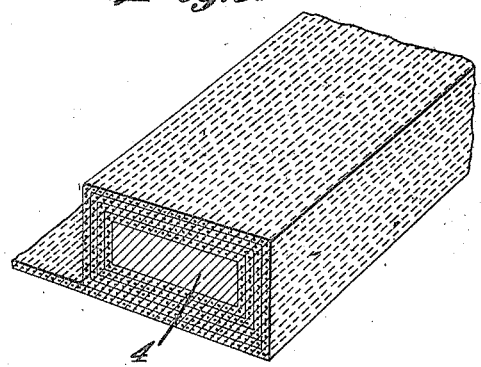
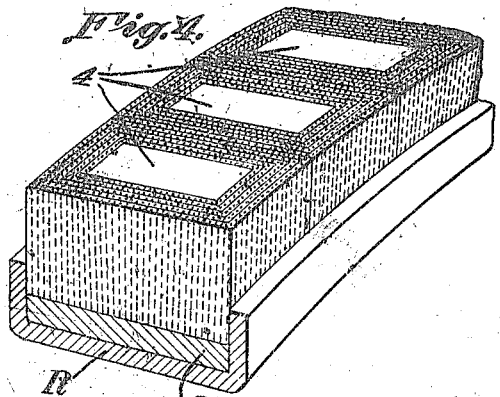
M. Beck, Inventor

UNITED STATES PATENT OFFICE.

MAX BECK, OF NEW YORK, N. Y.

CUSHION-TIRE AND METHOD OF MAKING THE SAME.

1,270,591.  Specification of Letters Patent. Patented June 25, 1918.

Application filed March 9, 1918. Serial No. 221,472.

*To all whom it may concern:*

Be it known that I, MAX BECK, a citizen of the United States, residing at New York, in the county of New York and State of New York, have invented new and useful Cushion-Tires and Methods of Making the Same, of which the following is a specification.

This invention relates to cushion tires and to a method of producing them, one of its objects being to provide a tire which is reinforced by cords extending radially therein and which serve to prevent the tire from slipping or skidding, there being additional cords extending transversely of the tread and at right angles to the sides of the tire, the radial and transverse cords intermeshing.

A further object is to provide certain novel steps in the method of building up the tire so that the same is produced cheaply in sections which can be assembled readily.

With the foregoing and other objects in view which will appear as the description proceeds, the invention consists of certain novel details of construction and combinations of parts, and of certain novel steps in the method, which will be hereinafter more fully described and pointed out in the claims, it being understood that various changes may be made in the construction and arrangement of the parts within the scope of the claims without departing from the spirit of the invention.

In the accompanying drawings the preferred form of the invention has been shown.

In said drawings:—

Figure 1 is a perspective view illustrating the first step in the method of making the tire.

Fig. 2 is a perspective view of the second step.

Fig. 3 is a similar view illustrating another step.

Fig. 4 is a view of a portion of a tire embodying the present improvements.

Referring to the figures by characters of reference, 1 and 2 designate superposed thin strips of unvulcanized rubber and interposed between these strips is a network of waterproofed cords 3 which are preferably about one sixty-fourth of an inch in diameter and are interwoven to form a coarse fabric, certain of the cords being extended longitudinally of the fabric while the remaining cords are extended transversely. The three thicknesses of material are then pressed together, the rubber being forced into the interstices in the fabric thereby to produce a single unvulcanized strip with reinforcing cords embedded therein. The strip thus produced can be of any desired proportions and is adapted to be wrapped tightly about a core of vulcanized rubber, shown at 4, and which can be rectangular or of any other desired cross sectional contour. This will produce a long body of material. In Fig. 3 such a body has been shown partly completed. After the body has been formed it is cut by a band saw or the like into suitable lengths which are then assembled on end upon a base strip 5 of hard rubber located on the wheel rim R, and as shown in Fig. 4. The entire tire is then vulcanized to the rim and is ready for use, all of the sections becoming united into a single body.

It will be noted that when the tire is thus formed many of the cords, as well as the cores, are extended perpendicularly or radially to the rim, thus affording an efficient anti-slipping surface.

What is claimed is:—

1. The combination with a rim having side flanges, of a rubber base strip fitted snugly between the flanges and upon the rim, and an annular series of blocks resting at their inner ends on the base strip, each block extending from one flange to the other and including a rubber core extending radially from the rim and alternate layers of fabric and rubber extending around the core, the outer edges of said layers and the outer ends of the cores of the blocks forming the tread surface of the tire.

2. A cushion tire including a rubber base strip and an annular series of blocks vulcanized together and to the base strip, the side faces of the blocks being flush and each block including a rubber core extending radially from the base strip, and alternate layers of fabric and rubber wrapped around each core, the outer edges of the said layers and the outer ends of the cores forming the entire tread surface of the tire.

3. The herein described method of making a cushion tire which consists in placing waterproofed intermeshing cords between thicknesses of unvulcanized rubber, pressing the rubber upon and between the cords to form a single strip of cords and rubber, wrapping the strip about a rubber core to form an elongated body consisting of a central core and surrounding layers of cords and rubber, then cutting the body into blocks of equal lengths, assembling the blocks on end and close together upon a rubber base strip seated on a wheel rim, the cores of the blocks extending radially from the base strip and the outer ends of said cores and the outer edges of the layers of rubber and cords forming the tread of the tire, and finally vulcanizing the entire structure.

In testimony that I claim the foregoing as my own, I have hereto affixed my signature in the presence of two witnesses.

MAX BECK.

Witnesses:
I. HAUSMAN,
ROBERT PECK.